United States Patent [19]

Chantriaux et al.

[11] Patent Number: 4,865,825
[45] Date of Patent: Sep. 12, 1989

[54] PROCESS FOR THE DECOMPOSITION OF SODIUM ALUMINATE LIQUOR FOR THE PRODUCTION OF ALUMINA

[75] Inventors: Eric Chantriaux; Henri Grobelny, both of Aix-en-Provence, France

[73] Assignee: Aluminium Pechiney, Paris, France

[21] Appl. No.: 90,706

[22] Filed: Aug. 28, 1987

Related U.S. Application Data

[62] Division of Ser. No. 48,883, May 12, 1987, Pat. No. 4,818,499.

[30] Foreign Application Priority Data

May 15, 1986 [FR] France ................................ 86 07149

[51] Int. Cl.$^4$ ................................................ C01F 7/06
[52] U.S. Cl. .................................... 423/127; 423/121; 423/629
[58] Field of Search ........................ 423/127, 121, 629

[56] References Cited

U.S. PATENT DOCUMENTS 1,251,296 12/1917 Sherwin ................................ 423/629
4,666,687 5/1987 Chantriaux et al. ................ 423/127

FOREIGN PATENT DOCUMENTS 1117274 2/1982 Canada ................................ 423/121

Primary Examiner—Robert L. Stoll
Attorney, Agent, or Firm—Dennison, Meserole, Pollack & Scheiner

[57] ABSTRACT

A process and an apparatus for the continuous decoposition of a supersaturated sodium aluminate liquor forming a suspension in the presence of aluminium trihydroxide seed characterised by:
(a) bringing into contact in a non-agitated grading decomposer a feed flow formed by the suspension and a recycling flow which is taken off in the underflow zone of the decomposer,
(b) simultaneously drawing off a production flow in the same underflow zone,
(c) extraction of an overflow flow at the overflow of the grading decomposer, and
(d) suitable regulation in dependence on the flow rate of the feed flow, the flow rate of the recycling flow, the speed of discharge flow of the suspension in the underflow zone and the speed of rise of the suspension in the overflow zone.

11 Claims, 3 Drawing Sheets

PROCESS FOR THE DECOMPOSITION OF SODIUM ALUMINATE LIQUOR FOR THE PRODUCTION OF ALUMINA

This is a continuation of co-pending application Ser. No. 48,883 filed on May 12, 1987, now U.S. Pat. No. 4,818,499.

TECHNICAL FIELD OF THE INVENTION

The present invention concerns a process and an apparatus for decomposition without agitation of supersaturated liquors of sodium aluminate for the production of alumina using the BAYER process, which is the major procedure for the production of alumina which is primarily intended to be converted into aluminium by igneous electrolysis.

In that process, the bauxite is subjected to hot treatment by means of an aqueous solution of sodium hydroxide, at a suitable level of concentration, causing solubilization of the alumina and the production of supersaturated solution of sodium aluminate. After separation of the solid phase forming the unattacked residue of the ore (red mud), the supersaturated solution of sodium aluminate is seeded with aluminium trihydroxide acting as a seeding agent in order to cause precipitation of aluminium trihydroxide.

That operation which is generally referred as "decomposition" by the man skilled in the art is generally carried out in a plurality of successive stages which are distinguished in particular by virtue of temperature, granulometry and quantity of seeding agent introduced, the layout for circulation of the liquors in the successive tanks and any recycling operations.

STATEMENT OF PROBLEM

Most of the industrial installations for the production of alumina performed the above-mentioned decomposition operation in reactors which are also referred to as agitated decomposers. The aim is to avoid any loss of material by the accumulation of particles in the bottom of the decomposers, but above all to retain the highest possible degree of homogeneity in the suspension. Thus, except for the increase in solid mass due to the decomposition reaction, a condition of identity is achieved in respect of the characteristics of the suspension contained in the decomposer itself, namely; concentration of solids and granulometry of such solids. An additional consequence of the agitation effect is identity in regard to distributions of residence times in the decomposer for the liquor itself and for the solid particles, irrespective of the size of the particles.

That composer technology which affects the circulation of the liquor and the solids in a state of suspension and accordingly requiring the use of a not inconsiderable amount of agitation energy, simultaneously modifies certain parameters which govern the mechanism of the chemical decomposition reaction and therefore the productivity of the liquor and also the quality of the precipitated solids, in particular their final granulometry.

Now, for the industrial production of a specific quality of alumina which is defined for example by its granulometry, while retaining a high level of productivity and limiting the level of power consumption, the man skilled in the art may be interested in providing for control, independently of each other, of certain parameters which cannot be dissociated from each other in the procedure involving agitated decomposers, which is accordingly difficult to optimize, namely:
the level of concentration of the solids confined within the decomposer,
the granulometry of such solids,
the distribution in respect of residence times of the liquor within the decomposer, and
the distribution in respect of residence times of the solid particles, which it may be wanted to be different from that of the liquor, but also different as among the various particles, depending on the size thereof.

It is from that point of view that a number of processes have been developed for producing large-grain alumina, that is to say with a maximum of 10% by weight of particles in the state of aluminium trihydroxide of smaller than 45 microns, with a level of productivity of higher than 80 kg of precipitated alumina per cubic metre of supersaturated liquor.

STATE OF THE ART

Certain processes for the precipitation of alumina by decomposition of a supersaturated solution of sodium aluminate in the presence of seeding agent provide a step for increasing the size of the seed particles in the decomposer, by increasing the residence time thereof, in contact with the renewed mother liquor. Thus, by limiting and even suppressing agitation, a zone with a high level of concentration of solid particles is created in the lower part of the decomposer by settlement of the seed particles, precipitation of alumina and the increase in size of said particles in contact with the circulating mother liquor occurring in the zone where there is a high level of concentration of solid particles.

Those decomposition processes are among densephase decomposition processes with accumulation or retention of seeding agent. Thus, the processes of U.S. Pat. Nos. 3 607 113 and 3 649 184 provide for decomposition of the supersaturated liquor of sodium aluminate in a single step using two-compartment decomposers. In the first agitated compartment which receives the mother liquor and the fine seeding agent, agglomeration of the particles of aluminium trihydroxide is effected, followed by an increase in the size of the agglomerates which are accumulated in the lower part of the decomposer from which they are discontinuously extracted, while the partially decomposed liquor is discharged by overflow means to the following decomposer after having passed through the second non-agitated compartment of the decomposer where selective retention of the grains takes place.

The particles which are accumulated at the base of each decomposer and over which precipitation of the liquor is uniformly effected are therefore extracted discontinuously and constitute the production after a cyclone separation stage which is essential to eliminate the first particles which are recycled, together with the partially depleted liquor, to the first compartment of each decomposer.

The process of U.S. Pat. No 4 364 919 provides for decomposition of the sodium aluminate solution in two separate steps. The first agglomeration step is carried out in an agitated tank in the presence of a small amount of graded seeding agent. The second step for nourishing and increasing the size of the agglomerates is carried out in weakly agitated tanks where the residence time of the solid is substantially greater than that of the depleted mother liquor which is discharged by overflow means. The level of concentration of solid particles may attain from 400 g/l to 1500 g/l.

Likewise, U.S. Pat. No 4 511 542, after a first phase of nucleation and agglomeration of aluminium trihydroxide particles in the presence of a small amount of graded seeding agent, provides for a thickening effect in respect of solid matter of the suspension by accumulation in a series of decomposers with the precipitation of alumina. The residence times of the aluminium trihydroxide particles vary from 30 to 90 hours and their level of concentration varies from 250 to 700 g/liter. The suspension with a high level of concentration of dry matter, which issues from the last decomposer, is graded as a totality to provide the production and the fine seeding agent which is recycled after washing.

In fact, those processes have the common aspect of providing for retention of the grains in the course of the decomposition phase in which precipitation of alumina occurs indiscriminately over all the grains of aluminium trihydroxide, irrespective of their size. That is therefore revealed by precipitation of alumina over the fine grains and premature impoverishment of the mother solution, but in particular by virtue of the obligation to carry out, in a final specific step, an operation of grading the suspension to separate the production from the seeding agent. There is therefore no grading of the particles in dependence on their size in the course of the decomposition operation, which makes it possible, for a given cut-off threshold, to provide for selective regulation of the residence time of the coarse particles and rapidly to eliminate the fine particles from the reaction medium.

The process in French No 1 187 352 which describes a fluidized bed precipitation process appears to solve that problem. It comprises maintaining a suspension of crystals or solid particles in equilibrium in a rising liquid. In such a bed, the dimensions and the levels of concentration of the solid particles decrease in an upward direction and the height of the fluid bed depends on the speed of upward movement of the liquid. It is then posible to provide for precise regulation of the threshold for retention of the particles depending on their diameter and consequently their residence time in the reactor by acting only on the speed of rise of the liquid, the characteristics of which must remain constant. If the liquid itself constitutes the reaction medium where liquid-solid material transfer occurs, it has to be continuously renewed.

In fact, it is well known that, in its industrial application and in particular for the decomposition of a solution of sodium aluminate, the use and then the continuous control of a fluid bed of that kind are highly delicate aspects. That is because of the high degree of instability of the fluid bed which, even in a steady-state mode of operation, is sensitive to the slightest fluctuations in the parameters which govern the hydrodynamic flow of the liquid as well as the precipitation mechanism: temperature, density, viscosity, size and shape of the grains, etc...

Our French application No 84-18135 shows that it is nonetheless possible to adopt on an industrial scale the fluid bed process for decomposition of a saturated solution of sodium aluminate and consequently to control the residence time of the particles of aluminium trihydroxide by truly selective retention of those particles, depending on the size thereof. For that purpose, it is appropriate to effect decomposition in a plurality of clearly separate steps. In the first agglomeration step which is carried out in a non-agitated tank, the particles of ungraded seeding agent pass in a downward direction through the non-agitated tank containing the supersaturated mother liquor. The coarse particles have a residence time and therefore a level of concentration which are reduced in comparison with the fine particles, which, combined with the absence of any agitation means, operates in a direction which is highly favourable to agglomeration and regularization of the agglomerate sizes. The use and stabilization of the dense bed in the second step, in the course of which selective retention and nourishing of the coarse agglomerates are effected, is facilitated by virtue of that procedure. The suspension issuing from the first decomposition step is injected in the lower part of a non-agitated decomposer, the high speed of circulation of the liquor permitting the coarse agglomerates to remain in the suspension injection zone, to incease in size with the precipitation of alumina and finally to settle, to be continuously removed at the base of the decomposer and directly constitute the production.

The fraction of fine particles which are not agglomerated or which are insufficiently agglomerated are rapidly entrained with the non-depleted liquor, by overflow means. In a third and final step, that liquor is depleted by precipitation in the presence of a make-up amount of recycled fine seeding agent.

Mastery of the quantitative and qualitative parameters involved in precipitation of alumina from supersaturated sodium aluminate solution does indeed imply, in this respect also, highly accurate and delicate regulating factors in carrying out and simultaneously controlling three decomposition steps and more particularly the first two steps which govern the stability of the fluid bed and the effectiveness of selective retention.

SUBJECT OF THE INVENTION

With a view to providing better individual mastery and consequently optimization of the conditions for the precipitation of alumina by decomposition of a supersaturated solution of sodium aluminate, the present applicants developed a process and an apparatus for carrying it into effect, which provides for simultaneously effecting grading, selective retention and nourishing of the particles of aluminium trihydroxide, thus avoiding:

either grading after decomposition of the particles for the production and the seeding agent, by virtue of the growth of the coarse particles which are selectively retained, to the detriment of the fine particles which are entrained at the overflow means, or a decomposition procedure involving three steps, without specific grading but with pre-calibration of the agglomerates in a first agglomeration step, then highly delicate regulation of the fluid bed for simultaneously effecting nourishing and selective retention in a second step.

More precisely, a first subject-matter of the invention is a process for continuous decomposition of a liquor of sodium aluminate which is supersaturated in respect of alumina, resulting from the alkaline attack on bauxite using the BAYER process and forming a suspension in the presence of aluminium trihydroxide seeding agent, characterised by the following steps:

(a) said suspension constituting the feed flow is introduced in the upper part of a non-agitated grading decomposer or reactor, in a tranquilization zone where said feed flow is brought into contact at a temperature of between 45° and 70 C. from a fraction of a suspension with as high level of concentration of solid particles, constituting the recycling flow which is taken off in the lower part of the grading decomposer in a zone referred to as the underflow zone, (b) at the same time another fraction of suspension with a high level of concentration of solid particles which directly constitute the production flow is drawn off in the underflow zone of the non-agitated grading decomposer, (c) the suspension with a low level of concentration of solid matter constituting the overflow flow is extracted in the upper part of the grading decomposer, and (d) for a previously established flow rate in respect of the feed flow, the flow rate of the recycling flow is regulated in such a way that:

the recycling flow rate is between 2 and 7 times the feed flow rate, the rate of discharge flow of the suspension in the underflow zone is between 1 meter and 10 meters per hour, and the speed of rise of the suspension in the overflow zone is between 0.5 and 5 meters per hour.

A second subject-matter of the invention is an apparatus referred to as a grading decomposer for carrying out the decomposition process characterised in that it comprises:

(a) a cylindrical-conical tank whose upper cylindrical part is provided with an overflow with a feed and tranquilization zone formed for example by a central shaft partially immersed in the suspension to be treated and whose lower conical part which is disposed in a zone referred to as an underflow zone is provided at its end with a draw-off conduit which is itself connected to an outlet conduit for the production flow, (b) means for transfer of the suspension from the underflow zone to said feed and tranquilization zone disposed in the upper part of the grading decomposer.

Thus, in accordance with the invention it is possible to provide for mutually independent regulation of the principal parameters involved in the decomposition of sodium aluminate liquors in the presence of an aluminium trihydroxide seed.

1. Distribution of the residence times of the particles entering the decomposer, which determines the final size of the particles for the production, is therefore so regulated as to increase very substantially (5 to 10 times) the residence time of the coarse particles with respect to that of the particles of smaller sizes which issue in the overflow mode with the partially decomposed liquor. That residence time is also greater than it would be in an agitated decomposer. That retention of the coarse particles in the underflow zone, insofar as it is sufficiently selective, makes it possible to preferentially increase the size of those particles by the decomposition reaction of the surrounding liquor and, by a suitably adapted arrangement for continuous extraction, to obtain directly the desired calibrated production.

The effect of selective retention of the seeding agent is achieved by the combination of two phenomena and the associated arrangements:

(a) grading of the particles according to their size by settlement in the suspension thereof. The grading effect is carried out in a cylindrical-conical decomposer which is arranged to operate as a settling vessel, which involves the absence of agitation and the presence of a tranquilization zone for the feed and recycling flows of the decomposer. Grading of the particles is effected by division of the feed and recycling flows between an underflow flow (sum of the recycling and production flows) containing the coarse particles and an overflow flow containing the fine particles.

The quality of the grading effect is governed by the concentration of solids in the feed flow, which is to be lower than 200 g/liter in the form of aluminium trihydroxide and preferably between 110 g/liter and 180 g/liter when the sodium aluminate liquor has a level of concentration of soda expressed as $Na_2O$ of between 100 g/liter and 200 g/liter with a weight ratio WR of concentration of $Al_2O_3$ in solution/caustic $Na_2O$ of between 0.5 and 1.2.

The grading effect is also regulated by the level of concentration of solid matter in the flow at the underflow which is to be between 300 g/liter and 900 g/liter expressed as aluminium trihydroxide as well as the speed of rise of the suspension in the overflow zone which is to be between 0.5 meter and 5 meters per hour and preferably between 1 meter and 3 meters per hour.

(b) the thickening effect in respect of solids in the suspension in the underflow zone. Without that thickening effect, the underflow zone would contain a suspension whose level of concentration of solid materials would be little different from that of the feed flow and the mean residence time of the particles issuing in the underflow mode would then be equal to the ratio of the mass of solid materials contained in the underflow zone to the flow rate of solid materials issuing in the underflow mode, that is to say, equal to the residence time in an agitated decomposer. In order significantly to increase that residence time, with constant decomposer volume and constant underflow flow rate, it is therefore necessary to increase the mass of solid materials confined within the decomposer. In accordance with the invention, that aim is achieved by re-injection by means of a pump which is internal or external to the decomposer, of the recycling flow which is drawn from the underflow with a high level of concentration of solid matter (300 g/l to 900 g/l) in the central shaft of the decomposer. That recycling results in an equilibrium of concentration of solid matter in the underflow zone, whose value more closely approaches that of the product issuing in the underflow mode, and therefore being higher, in direct proportion to an increased speed of discharge flow of the suspension in that zone.

For a given diameter of the decomposer therefore, the recycling flow is the determining factor. The speed of discharge flow of the suspension in the underflow zone is to be between 1 meter and 10 meters per hour and preferably between 3 meters and 8 meters per hour. The recycling flow is between 2 and 7 times the feed flow and is preferably between 2 and 3.5 times the feed flow.

2. Distribution in respect of the residence times of the liquor which governs the overall productivity of the same liquor is regulated in such a way as to make the residence times of the overflow and underflow liquors similar, thereby maximizing the overall productivity of the liquor, two means being used for that purpose:

(a) the choice of the respective volumes of the overflow and underflow zones, which are determined when the apparatus is constructed. The ratio of the volume of the overflow zone to the volume of the underflow zone is generally between 0.1 and 0.5.

(b) the recycling flow to the underflow of the decomposer, which is to be between 2 and 7 times the feed flow.

DESCRIPTION OF THE DRAWINGS

FIG. 1 shows a grading decomposer with external recycling by means of a centrifugal pump (12), and FIG. 2 shows another configuration with internal recycling by means of a helical pump (13).

Figure 1:
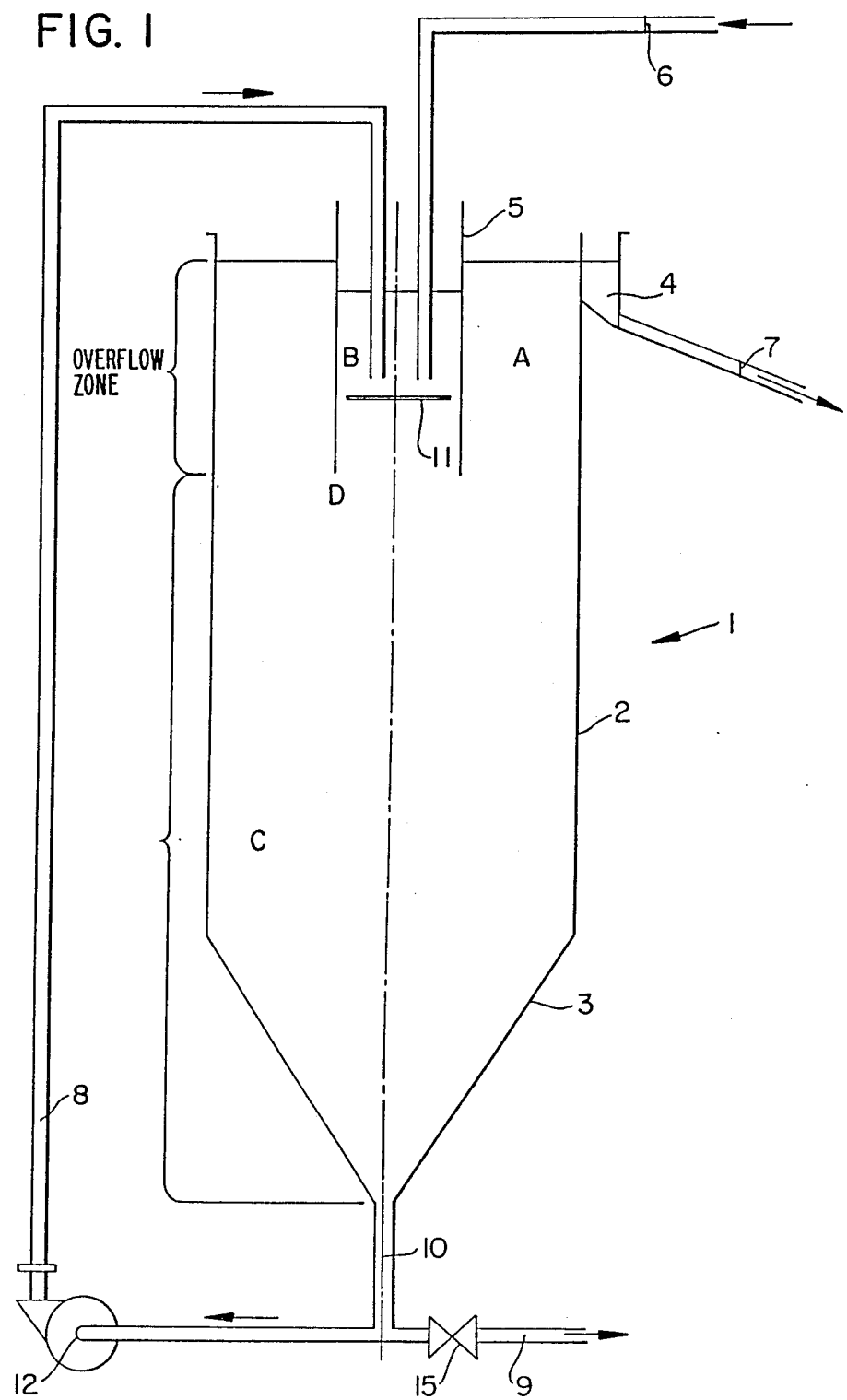
FIGS. 1 and 2 are diagrammatic views in vertical section of the apparatus for carrying out the invention.

The grading decomposer is a cylindrical-conical tank 1 comprising a cylindrical upper part 2 and a conical bottom 3. It is provided with an overflow 4 and a central stack or shaft 5 which is immersed in the aluminium hydroxide solution.

The upper part of the tank is therefore compartmented into two zones:

an overflow zone A between the shaft 5 and the cylindrical casing of the tank, and a feed zone B which is disposed within the shaft 5.

The lower part of the decomposer is referred to as the underflow zone C. Operation of the tank is linked to four different flows:

the feed flow 6
the overflow flow 7
the recycling flow 8
the production flow 9.

The feed conduit 6 and the recycling conduit 8 pass into the central shaft 5, the flows are mixed and form the feed for the tank in the zone B.

At the lower level D of the central shaft 5, the flow produced by the mixture of the feed 6 and the recycling 8 is divided into two to feed to overflow zone A and the underflow zone C.

The two conduits which pass into the shaft 5 are immersed in the zone B to avoid any risk of emulsion and therefore disturbance in the slow discharge flows of the suspension into the zone D. To break the jet, a horizontal plate 11 or any other static dispersing device is immersed in the zone B within the central shaft 5, at some tens of centimeters below the intake conduits for the feed flow 6 and the recycling flow 8, which are also immersed.

In the underflow zone, two flows are extracted from the bottom of the conical part:

the recycling flow 8, and
the production flow 9.

In FIG. 1, those two flows issue from the decomposer by way of the draw-off conduit 10; the recycling conduit 8 is then provided with a centrifugal pump 12 which delivers to the feed zone B.

Figure 2:
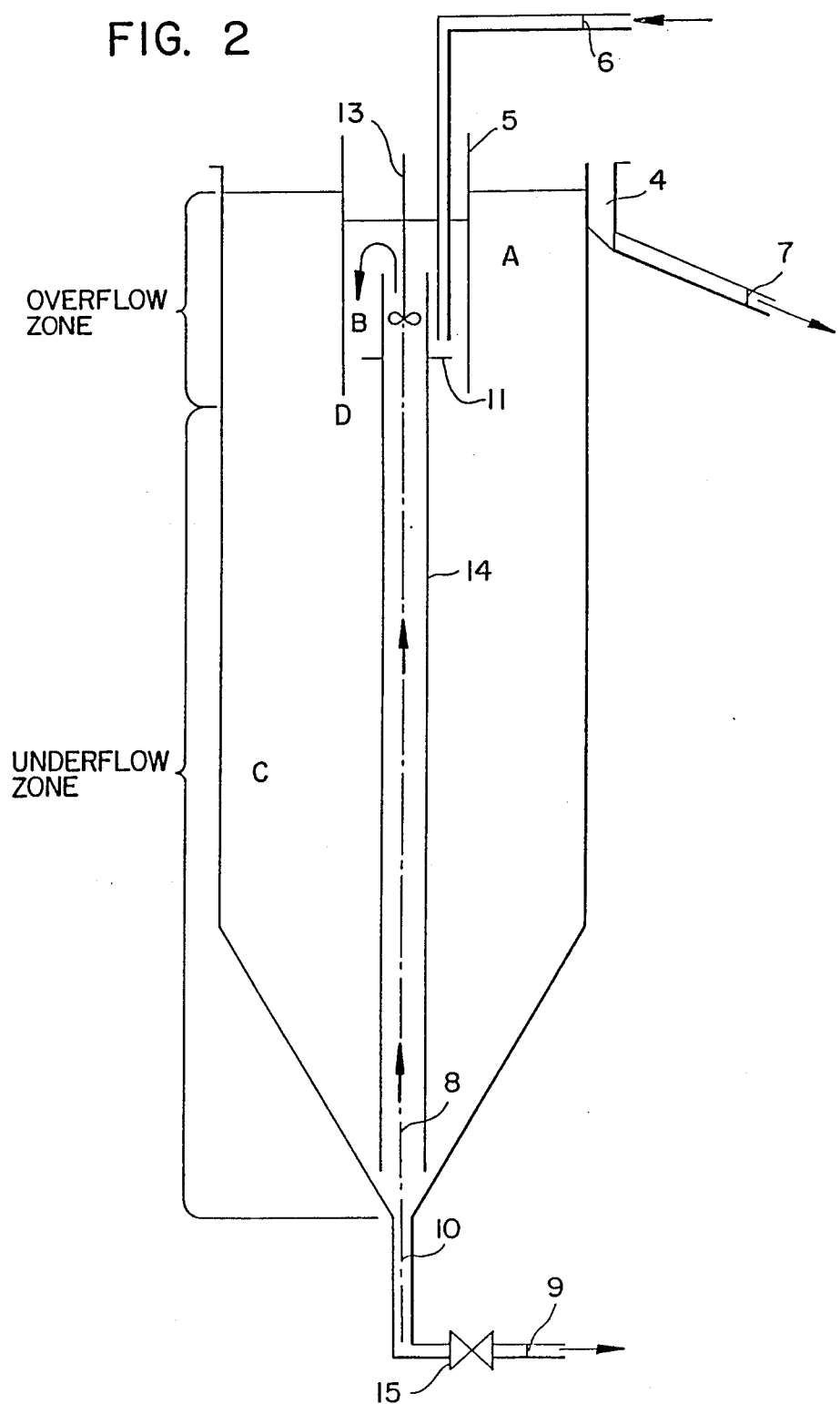

In FIG. 2, the recycling circuit is internal, a helical pump 13 providing for the flow of suspension which is drawn off at the bottom of the decomposer by virtue of a dip tube 14 which discharges into the same zone B.

The different flows referred to above, namely feed flow, overflow flow, recycling flow and production flow, produce a hydrodynamic equilibrium in respect of a slow flow configuration of the "plug flow" type which is characterised by a concentration of solid matter and granulometry in the underflow and overflow zones, as well as the residence time in respect of the solids and the liquors.

In the event of a stoppage in the feed, the tank is isolated by interrupting the production flow 9 by a shut-off means 15, and the recycling pump 12, FIG. 1, or the helical pump 13, FIG. 2, provides a sufficient flow rate to maintain a homogenous condition of concentration in respect of solids in the underflow zone C, and thus avoids any risk of deposits and clogging.

EXAMPLES OF USE

The first two examples of use of the invention are concerned with operation of the decomposer in the strict sense, in accordance with two separate operating conditions which are achieved in an industrial installation for the production of alumina.

Characteristics of the decomposer:
diameter of the tank: 9 m
diameter of the shaft: 3.15 m
useful volume: 1000 m$^3$
depth of immersion of the shaft: 3 m
volume of the overflow/volume of the underflow zone: 0.2

Characteristics of the liquor before the addition of seed:
sodium aluminate with 145 g/l of caustic soda
temperature: 65° C.

Characteristics of the suspensions of the different flows:
First example: (first operating condition)

| Feed | flow rate | 154 m$^3$/h |
|---|---|---|
| | solid particles | 158 g/l |
| | WR | 1.06 |
| | granulometry | 35% < 48μ |
| Overflow | flow rate | 132 m$^3$/h |
| | solid particles | 138 g/l |
| | WR | 0.95 |
| | granulometry | 47% < 48μ |
| Recycling | flow rate | 455 m$^3$/h |
| Production | flow rate | 22 m$^3$/h |
| | solid particles | 460 g/l |
| | WR | 0.93 |
| | granulometry | 9% < 48μ |

Speed of rise of the suspension in the overflow zone: 2.4 m/h
Speed of discharge flow of the suspension in the underflow zone: 7.48 m/h
Increase in size of the granulometric spectrum: 2% drop in those particles passing through 48μ (difference in percentage by mass in the particles which are smaller than 48μ in size, as between the feed flow and the mixture of the overflow and production flow).

Second example: (second operating condition)

| Feed | flow rate | 112 m$^3$/h |
|---|---|---|
| | solid particles | 165 g/l |
| | WR | 1.3 |
| | granulometry | 38% < 48μ |
| Overflow | flow rate | 98 m$^3$/h |
| | solid particles | 137.5 g/l |
| | WR | 0.877 |
| | granulometry | 54% < 48μ |
| Recycling | flow rate | 355 m$^3$/h |
| Production | flow rate | 14 m$^3$/h |
| | solid particles | 625 g/l |
| | WR | 0.860 |
| | granulometry | 5.5% < 48μ |

Speed of rise of the suspension in the overflow zone: 1.75 m/h
Speed of discharge flow of the suspension in the underflow zone: 5.8 m/h
Increase in size of the granulometric spectrum: 6% drop in those particles passing through 48μ.

The following three examples of use of the invention are concerned with use of grading decomposer in a decomposition loop.

Figure 3:
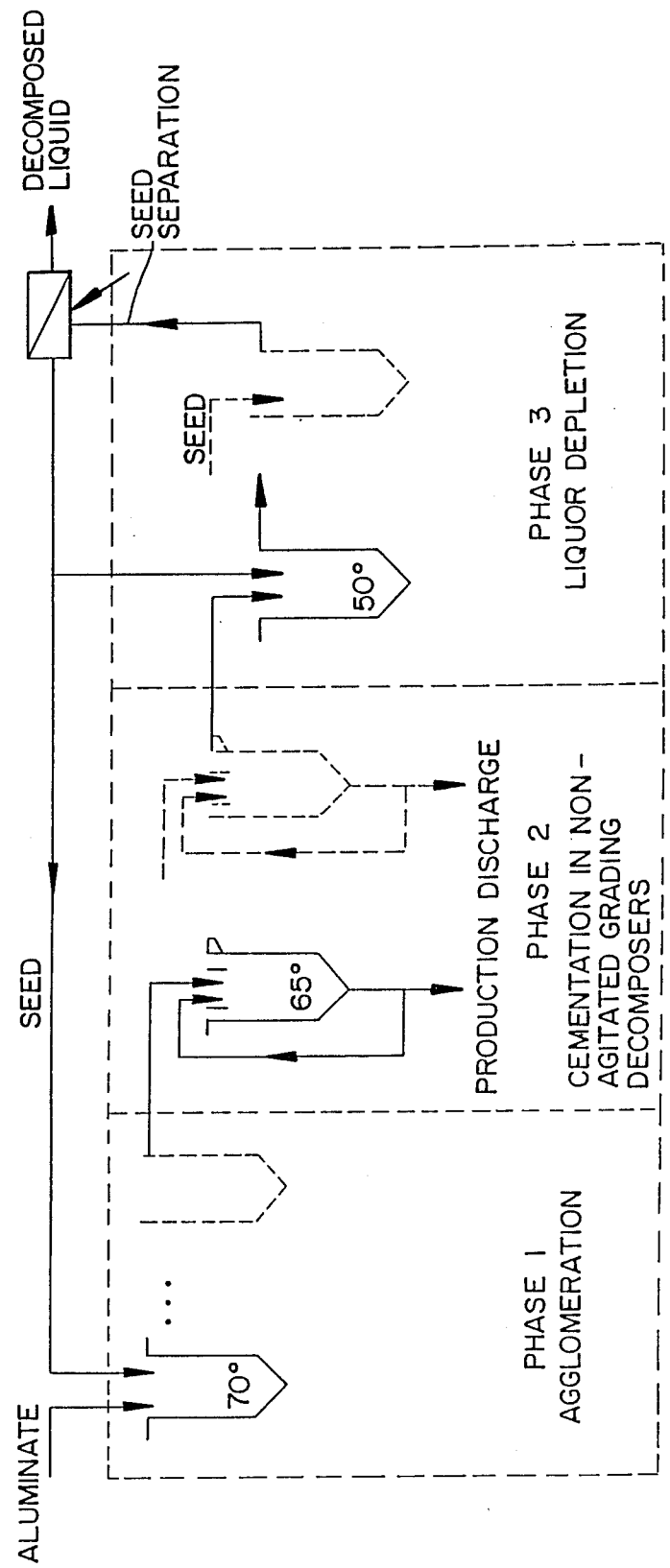
FIG. 3 is a general diagrammatic view of the invention being carried into effect in a decomposition process referred to as a three-phase process as described in examples of use Nos. 3 and 4.

In the third and fourth examples, the grading decomposer is used in a process referred to as an "ACPDD" process, involving three phases, which comprises, with reference to FIG. 3:

a phase "A" for agglomeration of the particles in suspension by concentration in respect of solids (reference phase 1), a phase "CPD" for cementation of the particles and production discharge wherein selective retention of the coarse particles permits consolidation of the agglomerates issuing from the phase "A" with their preferential increase in size and grading which permits the discharge thereof to constitute the production (reference phase 2), a phase "D" of depletion of the liquor in which the level of productivity of the liquor is particularly substantial with a high concentration of fine particles (reference phase 3).

It should be noted that, depending on the volume of suspension to be treated, issuing from the agglomeration phase 1, it is possible to use, depending on the capacity of the decomposers, one or more grading decomposers which are arranged in series and (or) in parallel.

Third example : (3 phases - A, CPD, D)

Phase 1 involves introducing 437 m³/h of aluminate liquor at 70° C., 160 g of Na₂O/liter, WR: 1.13, with 56 tonnes/hour of seed of aluminium trihydroxide coming from phase 3, so as to produce a suspension with 120 g/liter of seeding agent formed by particles of which 40% by weight is smaller than 48 microns. The residence time of the suspension is 8 hours in that first agglomeration phase and the suspension then reaches 410 g/l of the concentration of solids.

The suspension is then introduced into a stage formed by three grading decomposers identical to that described in Examples 1 and 2 and arranged in parallel. The suspension which is divided into three equal flows and which is maintained at 65° C. spends 18 hours in the decomposers. In the course of that second phase, the mean settings of each grading decomposer, for a feed flow rate of 462/3=154 m³/h of suspension, are as follows:

recycling flow rate : 462 m³/h speed of discharge flow of the suspension in the underflow zone : 7.8 m/h speed of rise of the suspension in the overflow zone: 2.1 m/h.

The graded production which is continuously extracted and which contains less than 10% by weight of particles of a size of smaller than 48 microns is washed while the overflow of the grading decomposer feeds phase 3 which receives the supplementary amount of seeding agent to attain a level of concentration of 730 g of solids per liter of suspension. Decomposition is continued for 16 hours until the weight ratio obtained is 0.60, and the seeding agent is then separated from the decomposed liquor. Fourth example : (3 phases - A, CPD, D)

Phase 1 involves introducing 194 m³/h of aluminate liquor of the same characteristics as in Example 3, with 7.5 t/h of aluminium trihydroxide seed, so as to produce a suspension with 38 g/l of concentration of solid particles of which 40% by weight are smaller than 48 microns. The suspension spends 10 hours in that first agglomeration phase, to attain 60 g/l solids concentration.

The suspension is then introduced into a grading decomposer identical to that of Examples 1 and 2, where it passes 24 hours at a temperature of 65°C. In the course of that second phase the settings of the grading decomposer, for a feed flow rate of 197 m³/h of suspension, are as follows:

recycling flow rate : 591 m³/h speed of discharge flow of the suspension in the underflow zone : 7.25 m/h speed of rise of the suspension in the overflow zone : 1.8 m/h.

The graded production which is continuously extracted and which contains less than 8% by weight of particles of a size of smaller than 48 microns is washed while the overflow flow from the grading decomposer still containing 20 g/l of solid particles feeds phase 3 which receives the supplementary amount of seeding agent to attain a level of concentration of 750 g/l of solids per liter of suspension. Decomposition is continued for a further 10 hours until the weight ratio is approximately 0.60 and the seed is then separated from the decomposed liquor.

Examples 3 and 4 show that a level of productivity of close to 85 kg of Al₂O₃ per cubic metre of aluminate liquor is obtained for an overall period of decomposition of the liquor of less than 50 hours, and that the substantial amount of fine seed with 40% by weight of particles smaller than 48 microns does not interfere with directly obtaining a production containing less than 10% by weight of particles of smaller than 48 microns. No other industrial process for the production of alumina makes it possible to attain that result without using a specific grading system, which is always burdensome, for the purposes of decomposition.

In a fifth example, the grading decomposer is used in a two-phase process wherein the first agglomeration phase remains unchanged while the phase involving cementation with product discharge and depletion are carried out in one and the same step.

Fifth example : (2 phases—A, CPDD)

Phase 1 involves introducing 500 m³/hour of aluminate liquor with 66 t/h of aluminium trihydroxide seed of the same characteristics as those used in Examples 3 and 4. The suspension which is formed in that way spends 18 hours in that first phase until a level of concentration of 150 g/l of solids is obtained.

That suspension is then introduced into a stage formed by three grading decomposers identical to that described in Examples 1 and 2 and which are arranged in series, the overflow flows of the first and second decomposers respectively forming the feed flow for the second and third decomposers. The suspension which is maintained at 65° C. has a residence time of a total of 42 hours in the three decomposers and, after cementation and consolidation of the aluminium hydroxide particles, permits direct extraction from each decomposer of a suspension containing at least 600 g/l of solid particles constituting the production with less than 6% by weight of particles of smaller than 48 microns. A total of 110 m³/h of suspension is thus drawn off while the overflow flow of the last decomposer which is formed by 440 m³/h of suspension with 150 g of dry matter per litre is filtered. The solid which contains 44% by weight of particles of smaller than 48 microns constitutes the seed which is introduced in phase 1 and the liquor, WR=0.60, is recycled to the operation of attacking the bauxite.

It appears that, even with a decomposition loop circuit which is reduced to two phases, it is possible to be without a grading operation for the purposes of decomposition, while maintaining a production which is in conformity with the required granulometric quality, and a level of productivity of liquor which is higher than 80 kg of Al₂O₃ per m³ of supersaturated liquor for total decomposition periods not exceeding 50 hours.

ADVANTAGES OF THE INVENTION

Industrial use of the invention for the production of alumina by means of the grading decomposer therefore affords many advantages from the following points of view: quality of product, productivity, working and capital investment.

(a) Quality of product: the invention permits industrial production of alumina with specific granulometric characteristics, by virtue of individual regulation and control of the decomposition parameters comprising residence times of the solids and the liquor, in combination with grading and selection of the particles on the basis of the size thereof in the decomposer.

(b) Productivity: in the absence of agitation, by a flow of the "plug flow" type of the suspension, the decomposition mechanism is close to that of a known methodical reaction. Moreover, it is possible to regulate the residence time of the liquor in a relatively uniform manner in the decomposer, and productivity of the liquor is then optimized.

(c) Working: the low inertia of the system provided by the grading decomposer makes it possible in the steady-state operating condition to directly modify or correct a parameter without unbalancing the whole of the reaction medium. The power required solely for pumping the recycling flow is substantially lower (25 to 30 KW) than that required for the operation of an agitated decomposer (40 to 70 KW for a tank with a useful volume of 3000 m$^3$), or that required for other arrangements which seek to provide the same levels of qualitative performance but which require a plurality of associated items of equipment.

Finally, circulation of the suspension in the apparatus makes it possible to avoid any dead area which is consequently inoperative in relation to the decomposition reaction, and limits the risk of the formation of residues which may be encountered with agitated decomposers.

(d) Capital investment: the equipment is simplified and reduced by virtue of using a single type of apparatus for performing a plurality of functions in the processes considered.

We claim:

1. A process for continuous decomposition of a liquor of sodium aluminate containing soluble Al$_2$O$_3$ values and caustic Na$_2$O values which is supersaturated in respect of alumina, resulting from the alkaline attack on bauxite using the BAYER process and forming a suspension of aluminum trihydroxide in the presence of aluminum trihydroxide seeding agent, comprising the steps of:

(a) introducing said suspension constituting a feed in the upper part of a non-agitated grading decomposer containing aluminum trihydroxide suspension below the surface of the suspension within said decomposer, in a tranquilization zone created by a centrally disposed tubular element extending from above into the tank below the surface of the suspension and bringing said feed in said tranquilization zone into contact at a temperature of between 50° and 75° C. with a recycling flow comprising a suspension with a high concentration of coarse solid particles of aluminum trihydroxide, which is taken off in the lower part of the grading decomposer in a zone referred to as the underflow zone and recycled to the tranquilization zone;

(b) at the same time drawing off further suspension with a high concentration of coarse solid particles of aluminum trihydroxide which directly constitutes the production flow from the underflow zone of the non-agitated grading decomposer;

(c) removing suspension with a low concentration of fine solid particles of aluminum trihydroxide constituting the overflow flow from the upper part of the grading decomposer externally of the tranquilization zone; and (d) for a previously established flow rate in respect of the feed flow, regulating the flow rate of the recycling flow in such a way that:

the recycling flow rate is between 2 and 7 times the feed flow rate, the rate of discharge flow of the suspension in the underflow zone is between 1 meter and 10 meters per hour, and the speed of rise of the suspension in the overflow zone is between 0.5 and 5 meters per hour.

2. A process according to claim 1 wherein the concentration of solids in the feed flow is lower than 200 g/liter in the form of aluminium trihydroxide.

3. A process according to claim 2 wherein the concentration of solids in the feed flow is between 110 g/liter and 180 g/liter in the form of aluminium trihydroxide.

4. A process according to claim 1 wherein the weight ratio WR of the concentrations of soluble Al$_2$O$_3$/caustic Na$_2$O in the solution to be decomposed is between 0.5 and 1.2.

5. A process according to claim 1 wherein the concentration of solids in the recycling flow is between 300 g/l and 900 g/l in the form of aluminium trihydroxide.

6. A process according to claim 1 wherein the recycling flow is between 2 and 3.5 times the feed flow.

7. A process according to claim 1 wherein the speed of discharge flow of suspension in the underflow zone of the grading decomposer is between 3 meters/hour and 8 meters/hour.

8. A process according to claim 1 wherein the speed of the flow in the overflow zone of the grading decomposer is between 1 meter per hour and 3 meters per hour.

9. A process according to claim 2 wherein the weight ratio WR of the concentrations of soluble Al$_2$O$_3$ to caustic in the solution to be decomposed is between 0.5 and 1.2.

10. A process according to claim 3 wherein the weight ratio WR of the concentrations of soluble Al$_2$O$_3$ to caustic in the solution to be decomposed is between 0.5 and 1.2.

11. A process according to claim 1, wherein the ratio of volume of the overflow zone to the underflow zone is between 0.1 and 0.5.

* * * * *